No. 889,569. PATENTED JUNE 2, 1908.
H. S. ALBRECHT.
CONCRETE COMPOSITION FOR BUILDING MATERIAL.
APPLICATION FILED SEPT. 13, 1907.
Fig. I.
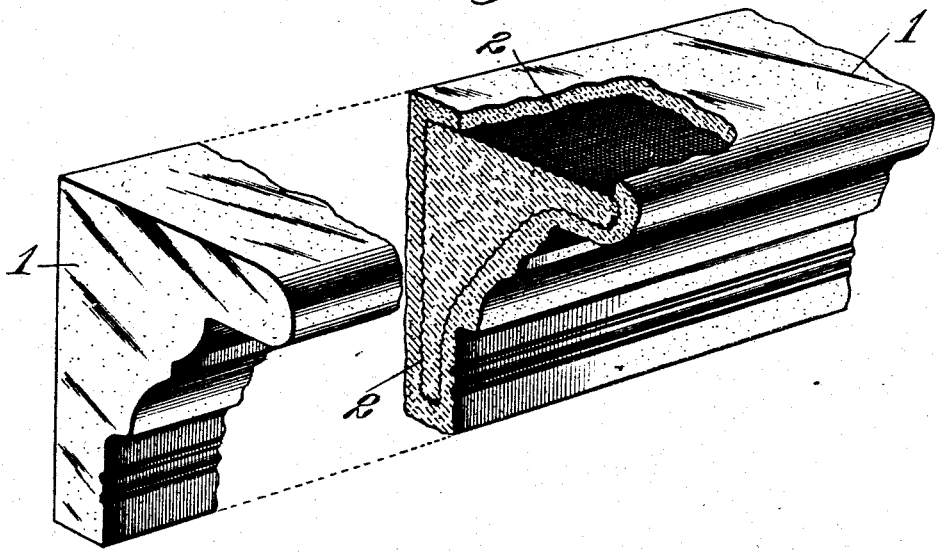
Fig. II.
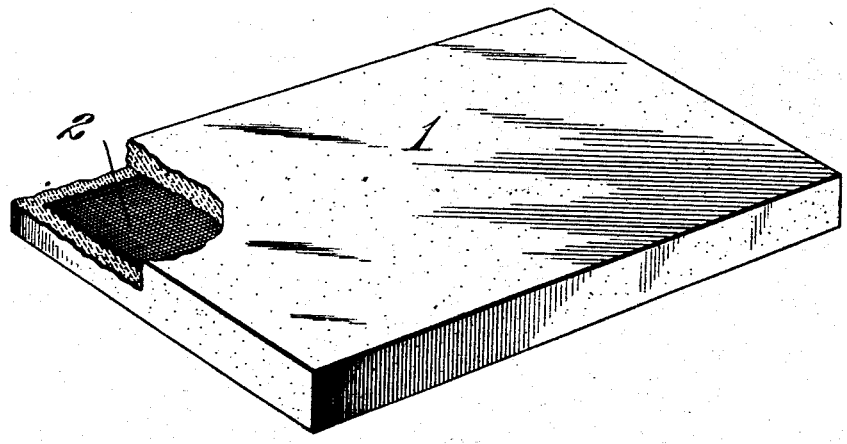
Attest:
Inventor:
H. S. Albrecht,

UNITED STATES PATENT OFFICE.

HERMAN S. ALBRECHT, OF ST. LOUIS, MISSOURI.

CONCRETE COMPOSITION FOR BUILDING MATERIAL.

No. 889,569.　　　　Specification of Letters Patent.　　　Patented June 2, 1908.

Application filed September 13, 1907. Serial No. 392,645.

*To all whom it may concern:*

Be it known that I, HERMAN S. ALBRECHT, a citizen of the United States of America, residing in the city of St. Louis and State of Missouri, have invented certain new and useful Improvements in Concrete Compositions for Building Material, of which the following is a full, clear, and exact description, reference being had to the accompanying drawing, forming part of this specification.

My invention relates to a concrete composition for building materials intended more particularly for use in making interior finishings, such as wainscoting, molding and floors and the invention has for its object the production of material of the kind named, which is fire-proof in nature, will not crack or crumble when subjected to a high heat and one which will readily receive an enamel coating for the production of a gloss surface to assimilate marble.

Figure I is a perspective view of a molding made of my building material, the molding being shown partially broken out and partially in section. Fig. II is a perspective view of a slab of building material partially broken out and suitable for flooring or as a filler in the walls of a building.

My building material preferably consists of cement, such as Portland cement, gypsum or plaster of paris, salt, and asbestos pulp. These substances may be used in the following proportions: Cement forty-five per cent, salt twenty-five percent, asbestos pulp twenty-five percent.

In making the composition the salt is used in solution to form a salt brine and the cement and asbestos pulp are mixed to produce a mass from which the articles of building material are produced in any suitable manner, such as by molding them or by rolling them in suitable machinery.

The salt utilized in my composition serves as a fire proofing agent. The asbestos pulp is used in composition to serve as a bonding agent and as a fire proofing agent.

I have found that it is desirable to incorporate with the ingredients previously mentioned, saw-dust (finely pulverized) or silicious sand. The saw-dust serves as a binder and also gives body to the building material composition and the silicious sand serves as a binder and fire-proofing agent and furthermore, gives body to the composition.

I prefer, in making my building material, to incorporate in the objects produced from the composition herein described, sheets of wire cloth for the purpose of reinforcing the objects and preventing cracking thereof when nails or other means of fastening the objects to supports are driven through the objects.

In the drawings, 1 designates the objects of building material and 2 the sheets of wire cloth.

I claim:

A building material composition containing cement, salt and asbestos pulp, finely pulverized saw-dust and silicious sand.

HERMAN S. ALBRECHT.

In presence of—
　BLANCHE HOGAN,
　LILY ROST.